(12) United States Patent
Cheng et al.

(10) Patent No.: US 9,319,195 B2
(45) Date of Patent: Apr. 19, 2016

(54) MULTIPLEXING PUCCH INFORMATION

(75) Inventors: Fang-Chen Cheng, Randolph, NJ (US); Lei Song, Fremont, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 2054 days.

(21) Appl. No.: 12/237,849

(22) Filed: Sep. 25, 2008

(65) Prior Publication Data
US 2009/0196238 A1   Aug. 6, 2009

Related U.S. Application Data

(60) Provisional application No. 60/997,115, filed on Oct. 1, 2007.

(51) Int. Cl.
| | |
|---|---|
| *H04W 4/00* | (2009.01) |
| *G08C 25/02* | (2006.01) |
| *H04L 5/00* | (2006.01) |
| *H04L 1/00* | (2006.01) |
| *H04L 1/16* | (2006.01) |
| *H04L 1/18* | (2006.01) |

(52) U.S. Cl.
CPC ............ *H04L 5/0053* (2013.01); *H04L 1/0027* (2013.01); *H04L 1/1671* (2013.01); *H04L 1/1692* (2013.01); *H04L 1/1893* (2013.01); *H04L 5/0007* (2013.01)

(58) Field of Classification Search
USPC ................ 455/70, 101, 134, 135; 375/260; 370/330, 331, 328, 329, 203, 208, 209, 370/210, 335
See application file for complete search history.

(56) References Cited

U.S. PATENT DOCUMENTS

| | | | | |
|---|---|---|---|---|
| 8,036,197 | B2 * | 10/2011 | Pajukoski et al. | ............. 370/342 |
| 8,102,802 | B2 * | 1/2012 | Ratasuk et al. | ............... 370/329 |
| 2006/0050799 | A1 | 3/2006 | Hou et al. | |

(Continued)

FOREIGN PATENT DOCUMENTS

| | | |
|---|---|---|
| WO | 2006130742 A1 | 12/2006 |
| WO | 2007084482 A2 | 7/2007 |
| WO | 2008157462 A1 | 12/2008 |

OTHER PUBLICATIONS

International Search Report and Written Opinion of the International Searching Authority for International application No. PCT/US2008/076787 mailed Jan. 22, 2010.

(Continued)

*Primary Examiner* — Hanh N Nguyen
(74) *Attorney, Agent, or Firm* — Carlson, Gaskey & Olds, P.C.

(57) ABSTRACT

An exemplary method of communicating includes multiplexing control signaling in a physical uplink control channel (PUCCH) onto a physical uplink shared channel (PUSCH) by puncturing PUSCH data with PUCCH control information using a uniform distribution of the PUCCH information within at least one resource block of the PUSCH data. One example includes using a first constant amplitude zero autocorrelation sequence (CAZAC) index on PUCCH for communicating CQI and ACK information together and using a second, different CAZAC sequence index for communicating CQI information alone or with NAK information or DTX. The used index provides an indication of whether ACK information is communicated. The used index also provides implicit DTX detection without additional processing.

19 Claims, 2 Drawing Sheets

(56) References Cited

U.S. PATENT DOCUMENTS

2007/0183386 A1* 8/2007 Muharemovic et al. ...... 370/344
2008/0080560 A1* 4/2008 Inoue et al. ................... 370/491
2008/0090528 A1* 4/2008 Malladi .......................... 455/70
2008/0165903 A1   7/2008 Hooli et al.
2008/0267157 A1* 10/2008 Lee et al. ..................... 370/342
2009/0046645 A1* 2/2009 Bertrand et al. .............. 370/329

OTHER PUBLICATIONS

International Preliminary Report on Patentability for International application No. PCT/US2008/076787 mailed Apr. 15, 2010.

* cited by examiner

MULTIPLEXING PUCCH INFORMATION

CROSS REFERENCE TO RELATED APPLICATIONS

This application claims priority to U.S. Provisional Application No. 60/997,115 which was filed on Oct. 1, 2007.

FIELD OF THE INVENTION

This invention generally relates to communication. More particularly, this invention relates to multiplexing communications.

DESCRIPTION OF THE RELATED ART

Wireless communication systems are well known and in widespread use. Typical cellular communication arrangements include a plurality of base station transceivers strategically positioned to provide wireless communication coverage over selected geographic areas. A mobile station (e.g., notebook computer or cellular phone) communicates with a base station transceiver using an over-the-air interface. The communications from the base station to a mobile station are downlink communications. Communications from a mobile station to the base station are uplink communications.

There are various channel configurations to facilitate uplink and downlink communications. One example channel is a physical uplink shared channel (PUSCH). Another example is a physical uplink control channel (PUCCH). In situations where both of them are present and it is desired to maintain the single carrier property of single carrier Frequency Division Multiple Access (SC-FDMA) technology, it becomes necessary to multiplex the information in the PUCCH onto PUSCH.

There are various agreed upon requirements associated with attempting to multiplex information in PUCCH onto PUSCH. The same gain factor should be maintained for multiplexing ACK/NAK or CQI information. The ACK/NAK or CQI should multiplex with the PUSCH with the same modulation scheme. Multiplexing the ACK/NAK and the PUSCH requires taking the error cases into account when ACK/NAK is not multiplexed at the user equipment transmission due to the missed detection of the scheduling indication at the previous time instance. The starting points in the circular buffer of the PUSCH should not be affected by the presence or absence of PUCCH control information.

One proposal is to puncture the output of the PUSCH information after the interleaver at the physical resource allocation with the allocation next to the demodulation reference signal (RS). While this next-to-RS multiplexing approach does not affect the starting position in a circular buffer, it does cause PUSCH hybrid automatic repeat request (HARQ) performance degradation. There is a need for a multiplexing strategy that satisfies performance criteria under a variety of conditions without such a drawback.

SUMMARY

An exemplary method of communicating includes multiplexing control information in a physical uplink control channel (PUCCH) onto a physical uplink shared channel (PUSCH) by puncturing PUSCH data with PUCCH information using a uniform distribution of the PUCCH information within at least one resource block of the PUSCH data.

In one example, repetition of the PUCCH control information provides additional error protection when it multiplexes onto PUSCH to ensure the guaranteed Quality of Service (QoS) of PUCCH control information and PUSCH data.

Another exemplary method includes using a first constant amplitude zero autocorrelation (CAZAC) sequence index for communicating CQI and ACK information together and using a second, different CAZAC sequence index for communicating CQI information alone or with NAK or discontinuous transmission (DTX) when ACK/NAK and CQI are transmitted on PUCCH in the same sub-frame. The used index provides an indication of whether ACK information is communicated and autonomous DTX detection when the mobile does not send ACK or NAK information.

The various features and advantages of the disclosed examples will become apparent to those skilled in the art from the following detailed description. The drawings that accompany the detailed description can be briefly described as follows.

DETAILED DESCRIPTION

Figure 1:
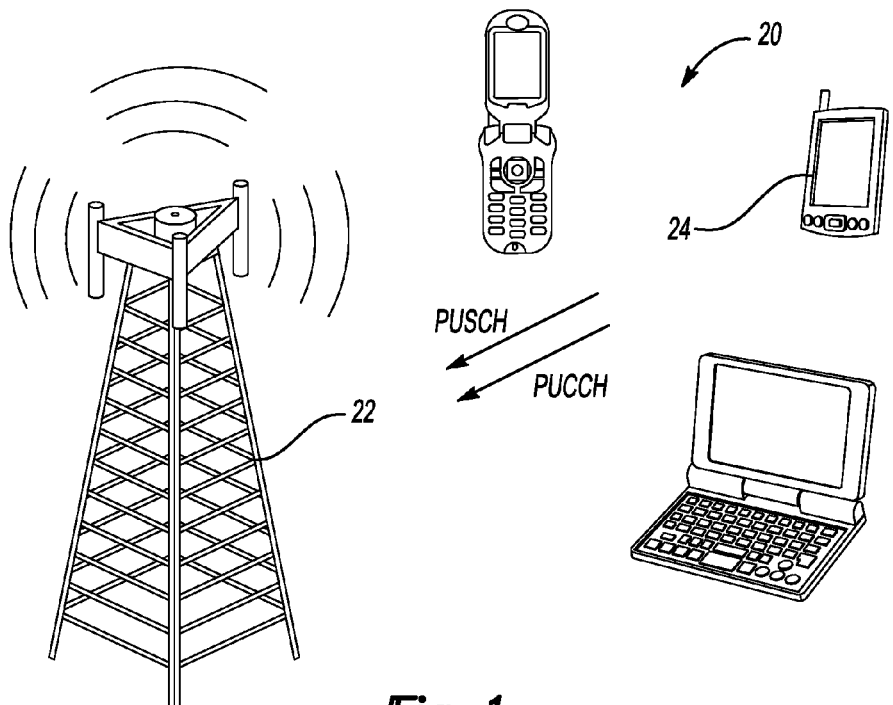
FIG. 1 schematically illustrates selected portions of a communication network designed according to an embodiment of this invention.

FIG. 1 shows selected portions of a wireless communication system 20. A base station 22 communicates with a mobile station 24. The communications between the base station 22 and the mobile station 24 occur in a downlink direction and an uplink direction. In this example, a physical uplink shared channel PUSCH and a physical uplink control channel PUCCH are used for communications in the uplink direction.

The term "communication" is used in this description to refer to transmitting or receiving information or signals. For example, the base station 22 may be communicating in the uplink direction by receiving information over the example uplink channels and the mobile station 24 may be communicating in the uplink direction by transmitting information or signals to the base station 22.

Figure 2:
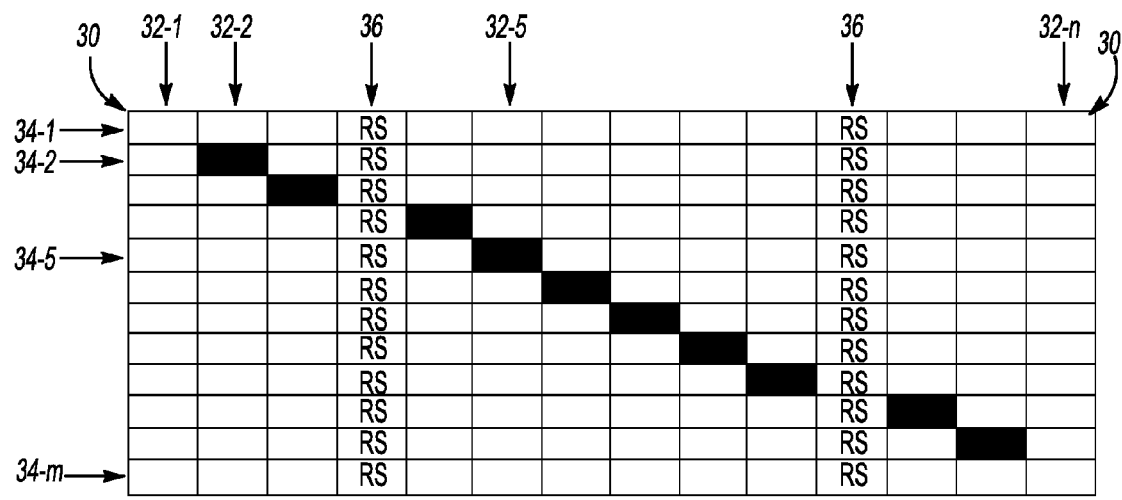
FIG. 2 schematically illustrates an example multiplexing pattern.

This example includes multiplexing the control information in PUCCH onto the PUSCH. FIG. 2 schematically illustrates one example multiplexing technique in accordance with an embodiment of this invention. In this example, a resource block 30 includes a plurality of symbols 32-1 through 32-$n$ represented by the illustrated columns. Each symbol 32 has a plurality of subcarriers 34-1 through 34-$m$ represented by the illustrated rows. This example includes puncturing PUSCH data with PUCCH information by mapping the PUCCH information uniformly within at least one resource block of the PUSCH data.

In the illustrated example, two of the symbols shown at 36 are dedicated to a demodulation reference signal (RS). Other symbols 32 are selected to have one or more subcarriers 34 that are selected to be occupied with PUCCH information. The subcarriers 34 that are darkened in the illustrations are occupied with PUCCH information in this example. All remaining subcarriers 34 are occupied with PUSCH data.

The uniform distribution of PUCCH information in this example has a pattern based on a relationship between a location of a selected subcarrier 34 of a selected one of the symbols 32 and a location of the selected one of the symbols 32 relative to the other symbols 32. In this example, each selected subcarrier 34 occupied with PUCCH information has a position in the associated selected symbol 32 corresponding directly to the position of the associated selected symbol 32 in the resource block 30. The position of the symbol 32 is indicated by the position of the columns in the illustration.

In this example, given the reference numbers 32-n and 34-m, the values of n and m, respectively can be used as an indication of the position of each symbol and subcarrier, respectively. In this example, the pattern for achieving the uniform distribution of the PUCCH information within the PUSCH includes placing the PUCCH information into the subcarrier 34-m of a selected symbol 32-n that has a numbered position m having a selected relationship to the numbered position n of the selected symbol. In other words, selecting a subcarrier 34 within a selected symbol 32 depends upon a selected relationship between m and n.

In the illustrated example, all of the PUCCH control information of interest for a given communication is placed within a single resource block 30. In this example, the relationship between m and n is a one-to-one correspondence. The subcarrier location within a symbol will equal the symbol location within the resource block 30. For example, the subcarrier 34-2 is occupied with PUCCH information because it is within symbol 32-2 and the subcarrier 34-5 is occupied with PUCCH information because it is within symbol 32-5.

Figure 3:
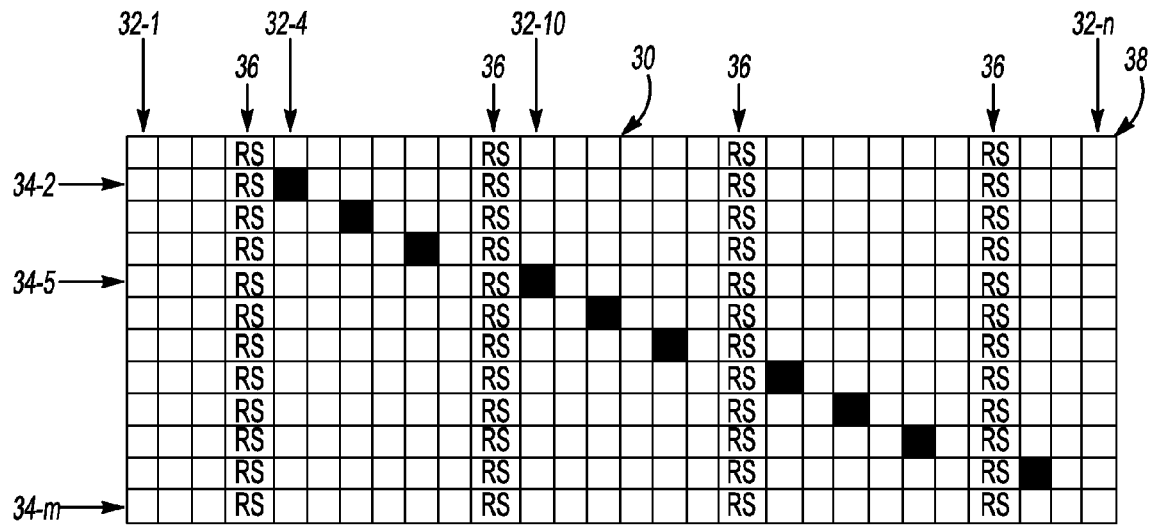
FIG. 3 schematically illustrates another example multiplexing pattern.

In other examples, the uniform distribution pattern does not require a direct correspondence between the positions of the symbols within the resource block and the positions of the subcarriers within the symbols. For example, when the PUCCH information is spread over N resource blocks, the pattern of uniform distribution is based on a relationship in which the subcarrier numerical position is 1/N the symbol position. One such distribution is shown in FIG. 3 in which the PUCCH information of interest is distributed over two resource blocks 30 and 38. The PUCCH information is more dispersed in this example. Subcarrier 34-2 in symbol 32-4 and subcarrier 34-5 in symbol 32-10, for example, are occupied with PUCCH information in the illustrated example.

With the example uniform distribution patterns, favorable performance results are achievable even when all of the PUCCH information must be contained in a single resource block. When it is possible to spread the PUCCH control information over several resource blocks, the performance, which can be considered in terms of bit error rate for example, is superior in some cases. In either event, the uniform distribution pattern of the disclosed examples provides better error performance than a random distribution or one that places the PUCCH information in a next-to-RS pattern.

The uniform distribution multiplexing technique is useful with a variety of communication techniques and provides good error performance with each. Table 1 below shows example performance information for one punctured, multiplexed resource block with slot hopping, TTI hopping and slot+TTI hopping, respectively. Table 1 is useful for evaluating the performance of multiplexing ACK/NAK PUCCH control information onto PUSCH with maximum 4 HARQ transmission in PB 3 km/hr, TU 120 km/hr and TU 350 km/hr channels. Table 1 shows performance comparisons between the uniform distribution pattern of the example of FIG. 2 and the next-to-RS technique.

Table 1 summarizes example results of three different hopping methods and shows the performance tradeoff between channel estimation loss and frequency diversity gain. Table 1 summarizes the required signal to noise ratio to achieve 0.1% ACK/NAK error rate and a 1% block error rate (BLER) after a maximum of HARQ transmissions for the two mapping methods mentioned in Table 1 (e.g., next-to-RS and uniform).

TABLE 1

| | | ACK/NAK BER = $10^{-3}$ | | | PUSCH BLER = $10^{-2}$ | | |
|---|---|---|---|---|---|---|---|
| Required SNR (dB) | | Slot Hopping | TTI Hopping | TTI + Slot Hopping | Slot Hopping | TTI Hopping | TTI + Slot Hopping |
| PB | Next-to-RS | 1.0 | 2.0 | 1.3 | −1.2 | −2.2 | −2.2 |
| 3 km/hr | Uniform | −0.1 | 2.0 | 0.2 | −1.2 | −2.2 | −2.2 |
| TU | Next-to-RS | 0.5 | 2.2 | 1.2 | −3.4 | −3.4 | −3.4 |
| 120 km/hr | Uniform | −0.6 | 1.6 | 0.0 | −3.4 | −3.4 | −3.4 |
| TU | Next-to-RS | 1.2 | 1.2 | 2.4 | −2.6 | −3.2 | −2.5 |
| 350 km/hr | Uniform | 0.0 | −0.4 | 0.8 | −2.6 | −3.2 | −2.5 |

As shown in Table 1, the PUSCH BLER performance has essentially no difference between the next-to-RS and uniform PUCCH distribution shown in FIG. 2 for all hopping cases in all channel conditions considered in Table 1. It is clear, however, that the uniform PUCCH distribution outperforms the next-to-RS PUCCH mapping in ACK/NAK bit error rate (BER) performance for all hopping patterns in all channel conditions.

For example, Table 1 shows that the slot hopping has the advantage of ACK/NAK BER performance over that of TTI hopping at the low (3 km/hr) and high (120 km/hr) due to the frequency diversity gain over the channel estimation loss. The slot hopping suffers in the ACK/NAK BER performance at an extremely high speed (350 km/hr) when the channel estimation loss is much more than the gain from frequency diversity. Given that there may be different performance criteria and different tradeoffs depending on the slot hopping, TTI hopping or both, one example allows the network to configure the hopping in the scheduling grant that includes the uniformly distributed multiplexed PUCCH information.

In Table 1, the required SNR to achieve a desired ACK/NAK BER and PUSCH BLER performance target when using one resource block has a discrepancy between 3 and 5 dB. When only one resource block is used, the required SNR to achieve the PUSCH BLER performance is the worst case because it is assumed that every sub-packet of the PUSCH HARQ transmission has ACK/NAK information multiplexed in it. In general, it will be possible to only have one or two of the HARQ sub-packets involved in the multiplexing.

There may be a performance disparity between the PUCCH control signaling and the PUSCH data when they are multiplexed together. In some examples this would force the PUSCH to use excessive power to compensate for the PUCCH. System throughput performance will be compromised if the power level is increased too much.

Figure 4:
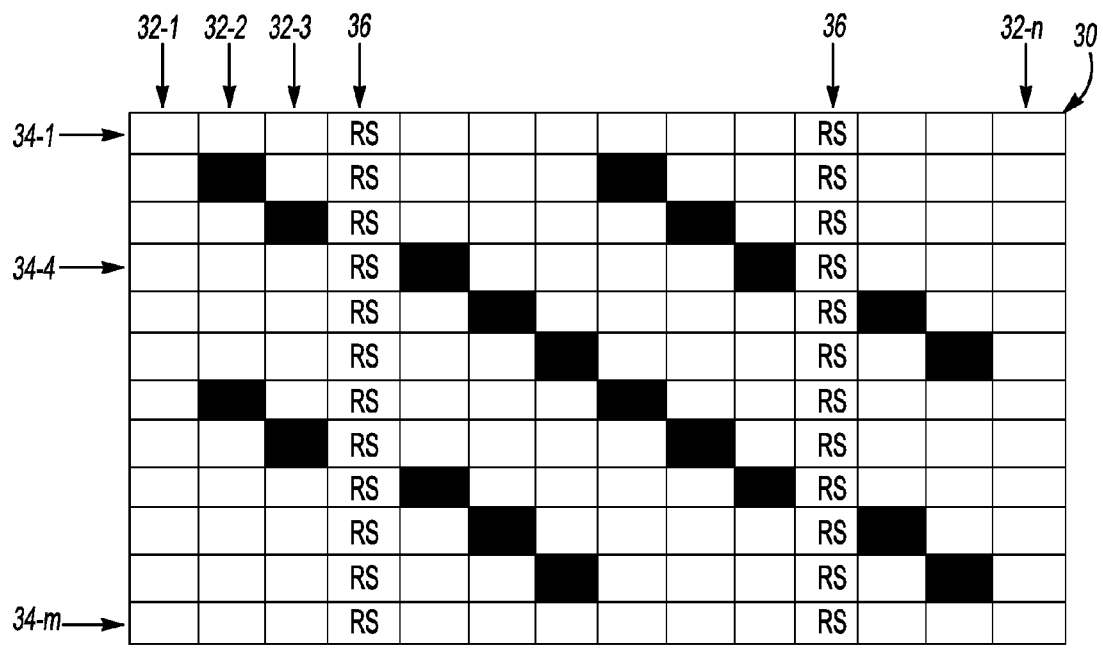
FIG. 4 schematically illustrates another example multiplexing pattern.

FIG. 4 schematically illustrates a multiplexing technique that effectively boosts the PUCCH control signaling performance when multiplexing the PUCCH information onto the PUSCH. The PUCCH information is repeated one or more times in this example with a uniform distribution according to the pattern shown in FIG. 4. In this example, symbols having sub-carriers occupied by PUCCH control information have more than one of the sub-carriers occupied with the PUCCH information. In the example of FIG. 2, only one sub-carrier for each selected symbol was occupied with PUCCH control information. By repeating the PUCCH control information in more than one sub-carrier of each selected symbol as in FIG. 4, the required SNR discrepancy between the PUCCH control information and the PUSCH data traffic can be reduced.

In some examples, the SNR discrepancy involves an approximately 1 dB difference. Such a difference is within an acceptable range for the PUCCH and PUSCH when multiplexing. Additional puncturing of the PUSCH for multiplexing PUCCH control information as schematically shown in FIG. 4 reduces the difference of the SNR required to achieve the target BER/BLER performance between the PUCCH control signaling and the PUSCH data traffic. Accordingly, the example technique of FIG. 4 reduces throughput performance loss in at least some examples.

The control information on PUCCH includes channel quality indicator (CQI) information, acknowledgement (ACK) information, negative acknowledgement (NAK) information or discontinuous transmission (DTX). The ACK/NAK and CQI are transmitted on its respective format on PUCCH when they are transmitted separately. If both ACK/NAK and CQI need to be transmitted in a subframe from a specific UE, the ACK/NAK field needs to multiplex on to the PUCCH format for CQI transmission. In some examples, a DTX is considered the same as a NAK since no transmission of ACK/NAK will have a result of re-transmission, which is the same effect of sending a NAK. It is necessary to provide a way to multiplex the ACK/NAK onto the PUCCH format for CQI transmission.

In one example, each user or mobile station is assigned a pair of two consecutive CAZAC sequence indexes on PUCCH frame format for CQI transmission. A first one of the indexes is always used by the user for communicating CQI and ACK information. A second one of the indexes is used for communicating CQI alone, CQI and NAK information or CQI and DTX information.

With this approach, detecting the CAZAC sequence index on PUCCH using a known CAZAC sequence hypothesis testing technique provides an indication of whether the communication includes CQI and ACK information. The performance of CQI alone or CQI with ACK/NAK or DTX remains the same. There is no performance disparity between CQI and ACK/NAK with this approach. Additionally, the example approach does not change the peak-to average power ratio (PAPR) of the transmitting signal when multiplexing ACK/NAK information onto PUCCH format for CQI transmission. Phase rotation does not create ambiguity and separation of CQI and ACK information on the one hand and CQI and NAK information on the other hand.

The HARQ in LTE is self-decodable. Receiving NAK information and DTX from the UE will trigger the HARQ retransmission. Therefore, no separate hypothesis testing is required for NAK information or DTX. Using the dedicated, second CAZAC sequence index is enough to cover multiplexing the CQI and NAK information or DTX transmission. The same CAZAC sequence index is used for communicating the CQI alone.

In one example, six out of twelve cyclic shifts of the CAZAC sequences with one shift separation PUCCH are allocated for the CQI communications to prevent interference caused by large delay spread. When the system is relatively heavily loaded the number of users requiring PUCCH resource allocation for CQI reporting is high. The chance of having the CQI and ACK/NAK information in the same time is much smaller under these conditions since the average scheduling cycle is long. In one example, six sets of CAZAC cyclic shifts, such as (1, 2) (3,4) (5,6) (7,8) (9,10) (11, 12) are assigned to six different users. When the CQI information is transmitted alone, the odd-numbered index is used in one example. One cyclic shift separation is sufficient to prevent interference most of the time because of the small probability that the CQI information and ACK/NAK information will be present at the same time.

In one example when the system is relatively lightly loaded the resource allocation need for CQI reports in the PUCCH is less demanding. Under these conditions, the chance of having the CQI and ACK/NAK in the same time increases since the scheduled cycle is much shorter. In one example, four sets of CAZAC cyclic shifts are assigned to maintain one shift separation between users. In one example, the four sets are (1,2) (4,5) (7,8) and (10,11). Because the system is lightly loaded there is generally no concern regarding having enough CAZAC sequence resources for allocation.

Using one CAZAC sequence index for all transmissions of CQI with ACK and another CAZAC sequence index for all transmissions of CQI alone, CQI with NAK or CQI with DTX provides an efficient way of multiplexing with the CQI. There is a minimal increase in complexity of PUCCH detection with this technique. Additionally, there is no performance disparity between the CQI and the ACK/NAK with this technique.

In another example, the system assigns CAZAC sequence cyclic shift information dynamically based on system load.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating at least channel quality indicator (CQI) information selectively multiplexed with acknowledgment (ACK) information, negative acknowledgment (NAK) information on a physical uplink control channel (PUCCH), comprising the steps of:
   transmitting CQI information from a transmitter;
   using a first constant amplitude zero autocorrelation sequence (CAZAC) index for transmitting CQI and ACK information together; and
   using a second, different CAZAC sequence index for transmitting CQI information alone or with NAK information
   such that the used first or second CAZAC sequence index provides an indication of whether ACK information is communicated through the PUCCH.

2. The method of claim 1, wherein the first sequence index and the second sequence index assigned to one user is distinct from the first sequence index and the second sequence index assigned to a different user on the PUCCH.

3. The method of claim 1, comprising
   assigning one of six sets of CAZAC cyclic shifts on the PUCCH to one of six different users, respectively.

4. The method of claim 1, comprising
   assigning one of four sets of CAZAC cyclic shifts on the PUCCH to one of four different users, respectively; and arranging the four sets to maintain at least one shift separation between each user and every other one of the four users.

5. The method of claim 1, wherein each user is assigned two indexes on the PUCCH and each user uses only one of the assigned indexes for communicating the CQI and ACK information and uses the other one of the assigned indexes for any other communication including CQI information.

6. The method of claim 1, comprising characterized by action of the reception of NAK information when the assigned indexes for communicating the CQI and ACK/NAK information.

7. The method of claim 1, comprising using the second CAZAC sequence index for a discontinuous transmission (DTX).

8. The method of claim 7, comprising
detecting a DTX based upon use of the second CAZAC sequence index.

9. The method of claim 8, comprising responding to a detected DTX in a manner that corresponds to receiving NAK information.

10. A method of communicating at least channel quality indicator (CQI) information selectively multiplexed with acknowledgement (ACK) information or negative acknowledgement (NAK) information on a physical uplink control channel (PUCCH), comprising the steps of:
receiving a communication at a receiver, the communication including a first constant amplitude zero autocorrelation sequence (CAZAC) index when the received communication includes CQI and ACK information together, the received communication including a second, different CAZAC sequence index when the communication includes CQI information alone or CQI information with NAK information; and
determining whether ACK information is communicated through the PUCCH based upon whether the received communication includes the first CAZAC sequence index or the second CAZAC sequence index.

11. The method of claim 10, wherein the first sequence index and the second sequence index assigned to one user is distinct from the first sequence index and the second sequence index assigned to a different user on the PUCCH.

12. The method of claim 10, comprising
assigning one of six sets of CAZAC cyclic shifts on the PUCCH to one of six different users, respectively.

13. The method of claim 10, comprising
assigning one of four sets of CAZAC cyclic shifts on the PUCCH to one of four different users, respectively; and
arranging the four sets to maintain at least one shift separation between each user and every other one of the four users.

14. The method of claim 10, wherein each user is assigned two indexes on the PUCCH and each user uses only one of the assigned indexes for communicating the CQI and ACK information and uses the other one of the assigned indexes for any other communication including CQI information.

15. The method of claim 10, comprising using the second CAZAC sequence index for a discontinuous transmission (DTX).

16. The method of claim 15, comprising
detecting a DTX based upon use of the second CAZAC sequence index.

17. The method of claim 16, comprising responding to a detected DTX in a manner that corresponds to receiving NAK information.

18. A communication device comprising:
a transmitter configured for transmitting at least channel quality indicator (CQI) information on a physical uplink control channel (PUCCH), the transmitter using a first constant amplitude zero autocorrelation sequence (CAZAC) index for transmitting CQI and acknowledgement (ACK) information together and using a second, different CAZAC sequence index for transmitting CQI information alone or with negative acknowledgement (NAK) information,
wherein the used first or second CAZAC sequence index provides an indication of whether ACK information is communicated by the transmitter through the PUCCH.

19. A communication device, comprising:
a receiver configured for
receiving a communication on a physical uplink control channel (PUCCH),
the received communication including a first constant amplitude zero autocorrelation sequence (CAZAC) index when the received communication includes channel quality indicator (CQI) information and acknowledgement (ACK) information together,
the received communication including a second, different CAZAC sequence index when the communication includes CQI information alone or CQI information with negative acknowledgement (NAK) information, and
determining whether ACK information is communicated through the PUCCH based upon whether the received communication includes the first CAZAC sequence index or the second CAZAC sequence index.

* * * * *